United States Patent [19]

Jarry

[11] 4,103,648
[45] Aug. 1, 1978

[54] INTERNAL COMBUSTION ENGINE WITH AIR RESERVOIR

[75] Inventor: Philippe Jarry, Sevres, France

[73] Assignee: Le Moteur Moderne, Boulogne-Billancourt, France

[21] Appl. No.: 730,321

[22] Filed: Oct. 7, 1976

[30] Foreign Application Priority Data

Oct. 17, 1975 [FR] France .................. 75 31775

[51] Int. Cl.² ............................................ F02B 41/00
[52] U.S. Cl. .................. 123/30 R; 123/32 E
[58] Field of Search .................. 123/30 R, 30 E, 32 J, 123/32 AH, 33 R, 32 E, 26, 33 B, 33 C, 33 E

[56] References Cited

U.S. PATENT DOCUMENTS

| | | | |
|---|---|---|---|
| 1,513,997 | 11/1924 | Ingram | 123/26 |
| 1,821,396 | 9/1931 | Nardin | 123/33 B |
| 2,098,031 | 11/1937 | Essl | 123/32 E |
| 2,103,974 | 12/1937 | Loeffler | 123/33 VC |
| 2,798,457 | 7/1957 | Davids | 123/76 |
| 2,994,310 | 8/1961 | Hopwood | 123/26 |

Primary Examiner—Charles J. Myhre
Assistant Examiner—Tony M. Argenbright
Attorney, Agent, or Firm—Finnegan, Henderson, Farabow & Garrett

[57] ABSTRACT

Disclosed is an internal combustion engine having a reservoir in communication through a passage with the combustion chamber. A valve is provided in the passage to enable the reservoir, when the valve is open, to receive a fraction of the air during the compression stage of the engine cycle. The valve closes in response to a decrease in pressure in the combustion chamber. The valve is automatically controlled to open at the beginning of the next compression stage to inject heated air into the combustion chamber. The valve then remains open to enable the reservoir to receive a fraction of air from the cylinder during its high pressure cycle for restitution to the cylinder chamber at the beginning of the next compression stage.

9 Claims, 4 Drawing Figures

INTERNAL COMBUSTION ENGINE WITH AIR RESERVOIR

The present invention concerns an internal combustion engine having at least one cylinder enclosing a piston movable alternately between top dead centre and bottom dead centre, means for introducing into the cylinder a charge of air for compressing in the combustion chamber during the movement of the piston towards top dead centre, means for introducing the fuel into the compressed air, means for removing the gases produced by the combustion and a cylinder-head for closing the cylinder.

It is to be noted first of all that the expression "internal combustion engine" used here designates a diesel engine as well as a two or four stroke ignition controlled engine.

In diesel engines for example, the air must be heavily compressed so that its temperature reaches a value sufficient to cause ignition of the fuel and to favour the progressive combustion thereof.

The knowledge that the rapidity of ignition and the quality of combustion condition the proper operation of these engines has led to attempts being made to increase the temperature at the end of compression and to cause as great a turbulence as possible. Unfortunately, the solutions proposed up to now to arrive at these results have not given entire satisfaction.

Thus have been developed so-called direct injection engines in which the fuel is injected in a finely sprayed form so that it spreads all over the combustion chamber, in which a high turbulence may take place. These engines have however the disadvantage that they need a relatively large combustion chamber, which makes them unsuitable for engines of small cubic capacity. Furthermore, they do not permit an appreciable reduction in the ignition delay. Finally, the means which they may comprise for creating the turbulence and thus improve the combustion, are insufficient at low rotational speeds and penalize the feeding of the engine.

Another technique currently used in engines of small cubic capacity comprises igniting the fuel in a pre-chamber forming all or a part of the combustion chamber, the proper preparation of the mixture being effected by a very high turbulence induced by the movement of the piston. However, this turbulence leads to a very appreciable loss of efficiency. In addition, the ignition conditions in this type of engine entail higher volume/compression ratios than in the preceding engines.

The present invention seeks to overcome these disadvantages and, to do this, it has as objective an internal combustion engine of the above-described type which is characterized in that it has a reservoir of air communicating with the cylinder and provided with an opening and closing means controlled in such a way as to allow the introduction of a fraction of the charge of air into said reservoir during the high pressure portion of the working cycle of the engine and the restitution of this fraction to the cylinder during the low pressure portion of the cycle.

Thanks to this arrangement, the ignition conditions are made easier by an increase of the air temperature at the moment of combustion whilst the air may be better used in creating a high turbulence not obtained by the movement of the piston nor by the intake system of the engine.

In fact, the fraction of the air charge which is heated during its introduction into the reserve transmits, at the moment of its restitution, the heat it has accumulated to the charge of air newly admitted into the cylinder.

It should be noted that the fraction of the charge of air contained in the reservoir plays no part in the expansion and only removes then but little energy from the burned charge.

It should also be noted that the quantity of air introduced into the cylinder during intake is the same as that introduced into a conventional engine, since the fraction bled by the reservoir is restituted to the cylinder at the end of charging or shortly afterwards.

Moreover, the very high pressure of the air stored in the reservoir ensures, when it is restituted, a high gas speed and therefore a high turbulence of the air admitted into the cylinder, at the moment of its compression. It will furthermore be noticed that this turbulence is independent of the r.p.m.

It will finally be noticed that, since the reservoir is in communication with the cylinder during the high pressure portion of the cycle, any irreversible process is avoided. The only irreversible process exists in fact when the fraction of the air charge is restituted.

Preferably, the introduction of the fraction of the charge of air takes place during compression and/or combustion whereas its restitution takes place at the end of the intake or beginning of compression.

Operating in such conditions, the best use can then be made of the energy stored in the reservoir.

It is also advantageous that the communication aperture between the reservoir and the cylinder is positioned as tangentially as possible to the edge of the latter. In this case, the fraction restituted at high speed achieves in fact the maximum kinetic moment, which improves the turbulence.

Moreover, since it comes from a peripheral region it contains the minimum of burnt-gases, which enables an acceptable temperature to be obtained in the reservoir during the storing period and consequently a better thermal behaviour thereof and of its opening and closing device.

According to one particular embodiment of the invention, the opening and closing device comprises a valve movable inside the reservoir, between a closing position in which it bears on a valve-seat provided at the inlet of the reservoir and an opening position in which it is lifted from the seat, said valve having a piston forming, with the internal wall of the reservoir a passage of calibrated section and defining a space with the bottom thereof and by an automatically controlled butterfly valve placed in a canal connecting the space with the cylinder, said butterfly valve being controlled so as to close the canal during the introduction of the fraction of the air-charge in the reservoir and to open said canal to permit restitution of said fraction.

At the beginning of compression, the pressure of the charge of air contained in the cylinder increases and the valve lifts from its seat. Air then enters the reservoir and penetrates into the space. But, because of the loss of charge that the air undergoes in passing at right angles to the valve-seat and the piston, the pressure which is established in the space in lower than the pressure in the reservoir, which is itself lower than that in the cylinder. The valve therefore remains open until the maximum pressure of the cycle is reached in the cylinder.

Then, when the pressure in the cylinder begins to decrease, a reverse air-flow is established between the space and the reservoir, on the one hand, and between the reservoir and the cylinder, on the other. But because of the loss of charge at right-angles to the valve-seat and the piston, the pressure inside the space remains higher than the pressure in the reservoir, which itself remains higher than that in the cylinder. Now, because of these differences of pressure, the valve closes automatically imprisoning the air contained in the space and the reservoir, this air being maintained at a pressure slightly higher than that in the cylinder at the moment of closing the valve.

Of course, as soon as the butterfly valve is open, the air of the space enters the canal controlled thereby and the pressure in the space falls rapidly. On the other hand, the pressure in the reservoir falls slowly because of the loss of charge at right-angles to the piston and causes the opening of the valve, which permits the air contained in the reservoir to be ejected towards the cylinder.

We can see therefore that the opening and closing of the valve is obtained solely by pneumatic means.

In the opening and closing device of the reservoir, the canal may be located either outside or inside thereof and may pass axially through the piston and the valve, the butterfly valve being in this case provided in front of the inlet of the canal which is turned towards the space.

The internal combustion engine of the invention is further characterized in that the reservoir is provided in a body independent of the cylinder head on which it is removably mounted.

This arrangement not only simplifies the construction of the engine but also permits the use of reservoirs at different capacities and even possibly modifiable during engine operation depending on the conditions of use thereof.

The invention will be better understood from the following description given solely as an example, in conjunction with the accompanying drawings in which.

Figure 1:
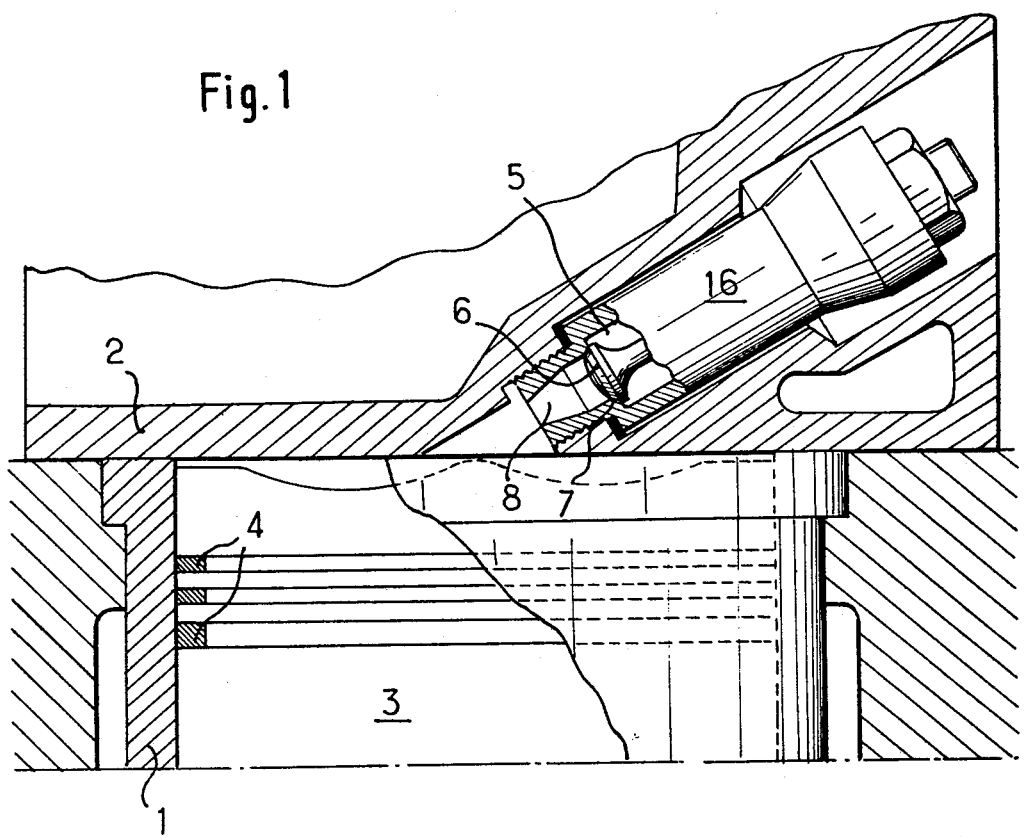
FIG. 1 is a partly cut-away sectional view showing diagrammatically the upper part of an internal combustion engine cylinder fitted with an air reservoir of the invention.
Figure 2:
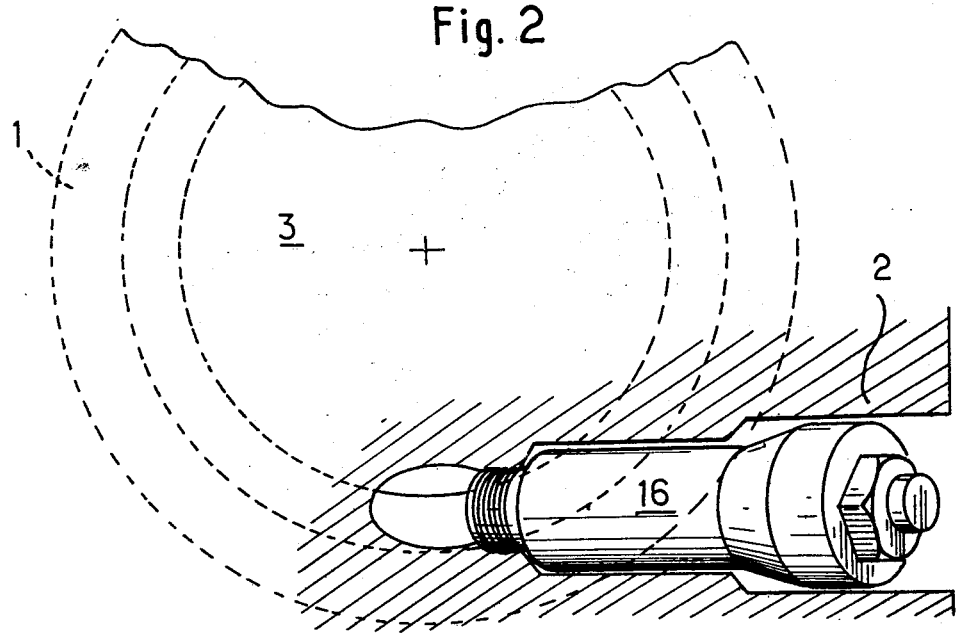
FIG. 2 is a diagrammatic top view in partial section of the cylinder and reservoir shown in FIG. 1.

With reference first of all to FIGS. 1 and 2 we see a cylinder 1 of an internal combustion engine, which is closed by a cylinder head 2 and in which a piston 3 fitted with piston rings 4 moves in a known way between top dead centre and bottom dead centre.

Cylinder 1 generally comprises means for permitting the intake of a charge of air which is compressed during the movement of the piston towards top dead centre, means for introducing the fuel into the compressed charge and means for exhausting the burnt gases. These different means have however not been shown for simplicity's sake.

The cylinder head 2 encloses an air reservoir 5 opening into the upper part of the cylinder.

In accordance with the present invention reservoir 5 is provided with an opening and closing device which is controlled so as to permit the introduction of a fraction of the charge of air into said reservoir during the high pressure portion of the working cycle of the engine, and restitution of this fraction to the cylinder during the low-pressure portion of the cycle.

According to the embodiment envisaged here, this opening and closing device comprises on the one hand a valve 6 movable inside the reservoir between a closing position in which it seats on a valve-seat 7 at the inlet 8 of the reservoir and an opening position in which it is moved away from the seat, valve 6 having a piston 9 providing a calibrated section passage 10 in conjunction with the internal wall 11 of the reservoir and defining a space 12 with the bottom 13 thereof and, on the other hand, an automatically controlled butterfly valve 14 placed in a canal 15 connecting the space 12 and cylinder 1 and controlled so as to close off the canal during the introduction of the fraction of the air charge into the reservoir and to open said canal to permit restitution of said fraction.

It is to be noted that, in this embodiment, reservoir 5 which is sloping in relation to cylinder 1 and whose inlet 8 is as tangent as possible to the cylinder edge (see FIG. 2) is conceived as a body 16 removably mounted on cylinder head 2, e.g. by bolting.

Figure 3:
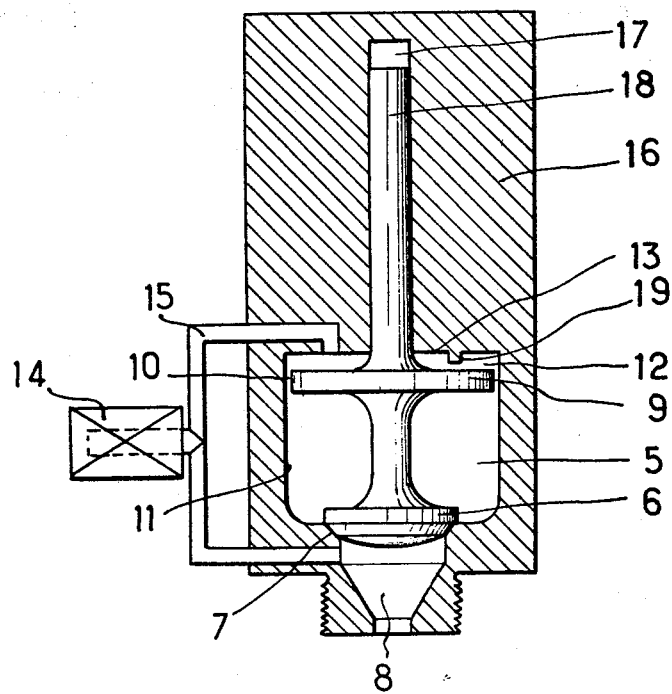
FIG. 3 is an enlarged sectional view of the reservoir and its opening and closing device, the reservoir being in a body independent of the cylinder head.

In the first variation shown in FIG. 3, body 16 has an axial bore 17 receiving a rod 18 integral with the valve and guiding the latter during its movement. It also includes a stop 19 provided at the bottom 13 of the reservoir and against which piston 9 comes into contact during opening of the valve.

It will be noted that canal 15 has a section located outside body 16 and in which butterfly valve 14 is placed.

Figure 4:
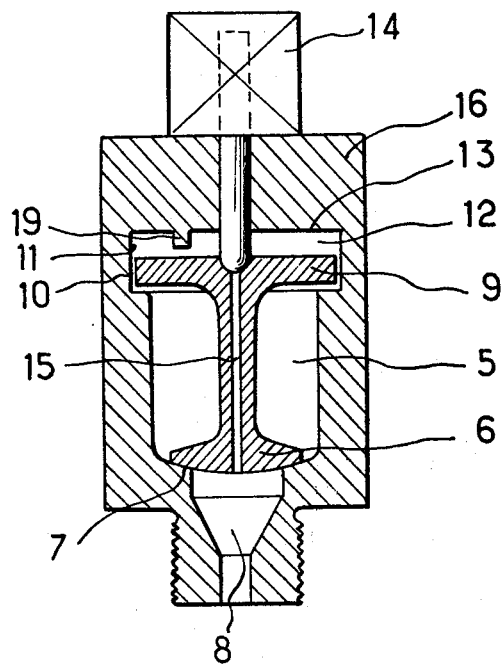
FIG. 4 is a sectional view of another embodiment of the arrangement of FIG. 3.

In the second variation of body 16 shown in FIG. 4, canal 15 is provided inside the reservoir. It in fact passes through valve 6 and piston 9. As for butterfly valve 14, it is provided on the upper part of body 16 and controls that inlet of the canal which is turned towards the space 12.

The operation of the opening and closing device of reservoir 3 will be described hereafter from the moment when the compression of a charge of air admitted into cylinder 1 begins, butterfly valve 14 then closing off canal 15.

While piston 3 moves towards top dead centre, the pressure of the charge of air increases, so that valve 6 is lifted from its seat 7. A fraction of the charge of air penetrates immediately into reservoir 5 and into space 12. However, because of the loss of charge created at right-angles to seat 7 and piston 9, the pressure which is established in space 12 is lower than the pressure in reservoir 5, which is itself lower than that in cylinder 1. Valve 6 remains then open until the maximum pressure of the cycle is reached in the cylinder.

Then, when the pressure in the cylinder begins to decrease, a reverse air-flow is established between the reservoir and the cylinder, on the one hand, and between the space and the reservoir on the other. However, again because of the loss of charge at right-angles to the seat and the piston, the pressure inside the space remains higher than that inside the reservoir which is itself higher than that in the cylinder. Because of the differences of pressure applied to the piston and to the valve, this latter closes automatically imprisoning the air contained in the reservoir and in the space at a high temperature resulting from the compression.

The fraction of the charge of air thus imprisoned is maintained at a pressure slightly higher than that in the cylinder at the moment of closing the valve. It will furthermore remain imprisoned until the butterfly valve commands the opening of canal 15, i.e. towards the end of the intake of a new charge of air into the cylinder. At that moment, the air contained in space 12 enters canal 15 to go towards the cylinder, whilst the pressure in the space falls rapidly. The pressure in the reservoir falls, on the contrary, slowly because of the loss of charge at right-angles to the piston, so that a difference of pressure is formed between the space and the reservoir and causes the valve to open. The fraction of the charge of air imprisoned in the reservoir is then restituted to the cylinder and communicates its heat to the new charge of air which has just been admitted. This is brought up to a higher temperature, which permits the temperature at the end of combustion to be raised and the delay in ignition of the fuel to be reduced. Furthermore, since inlet 8 of the reservoir is sloping in relation to the cylinder and communicates above the periphery of piston 3, a considerable kinetic moment appears creating a high turbulence.

What we claim is:

1. An internal combustion engine comprising at least one cylinder, a piston within said cylinder and defining a chamber therewith, said piston being movable alternately between top dead center and bottom dead center positions within said cylinder, means carried by said engine providing for a continuous operating cycle including, in sequence, intake, compression, power and exhaust stages, said operating cycle means including in said compression stage means for introducing into said chamber a charge of air for compression therein during movement of said piston toward top dead center, means defining a reservoir in communication with said chamber, means for charging said reservoir with a fraction of the air introduced into said chamber during said compression stage, means operable during said power stage for temporarily capturing within said reservoir the fraction of air charged therein and preventing communication between said reservoir and said cylinder, and means operable at the beginning of the next compression stage for restituting to said chamber the fraction of air previously charged into said reservoir.

2. An engine according to claim 1 including means defining a passage providing communication between said reservoir and said chamber, said capturing means including a member movable between positions opening and closing said passage, and means responsive to a decrease in pressure in said chamber for automatically moving said member to a position closing said passage.

3. An engine according to claim 1 including means defining a passage providing communication between said reservoir and said chamber, said restituting means including a member movable between positions opening and closing said passage, means for moving said member to a position closing said passage and maintaining said member in position closing said passage during the power, exhaust and intake stages, and means in controlling relation to said member to enable said member to move to the position opening said passage substantially at the beginning of the next compression stage, and means responsive to an increase in pressure in said chamber during said compression stage for moving said member to a position opening said passage.

4. An engine according to claim 1 including means defining a passage providing communication between said reservoir and said chamber, a member movable in said reservoir between positions opening and closing said passage, said member including a piston defining with portions of the wall defining said reservoir a predetermined passageway between the opposite sides of said piston, one side of the latter piston defining with said reservoir a chamber, means defining a conduit in communication between the chamber in said reservoir and the chamber in said cylinder, a remotely controlled valve in said conduit means, said valve being operable to close said conduit means when the fraction of air is being charged to said reservoir and open said conduit means substantially at the beginning of said next compression stage.

5. An engine according to claim 4 wherein said conduit means is located externally of said reservoir.

6. An engine according to claim 1 wherein said conduit means is located in said member and within said reservoir.

7. An engine according to claim 6 wherein said conduit means passes axially through the piston in said reservoir and has an inlet in communication with the chamber in said reservoir, said valve being located at said inlet.

8. An engine according to claim 4 wherein, when said passage is open to charge said reservoir, the piston in said reservoir and the wall portions of said reservoir restrict the flow of air through said passageway toward the chamber in the reservoir to develop a lower pressure in the chamber in said reservoir than on the opposite side of the piston within said reservoir to prevent closing of said passage by said member, the piston in said reservoir and the wall portions of said reservoir restricting the flow of air through said passageway away from the chamber in the reservoir in response to a decrease in pressure in the cylinder chamber during said power stage to develop a higher pressure in the chamber in said reservoir than on the opposite side of the piston within said reservoir to cause said member to close said passage.

9. An engine according to claim 1 wherein said restituting means includes means for injecting the fraction of air within said reservoir in a substantially tangential direction relative to said cylinder.

* * * * *